J. K. GUMPPER.
WHEEL REMOVING TOOL.
APPLICATION FILED JUNE 13, 1918.

1,311,272. Patented July 29, 1919.

Inventor
John K. Gumpper
By Brown Hanson Cotten
Attorneys

UNITED STATES PATENT OFFICE.

JOHN K. GUMPPER, OF DECATUR, ILLINOIS, ASSIGNOR OF ONE-HALF TO W. H. WOOLUMS, OF DECATUR, ILLINOIS.

WHEEL-REMOVING TOOL.

1,311,272.   Specification of Letters Patent.   Patented July 29, 1919.

Application filed June 13, 1918. Serial No. 239,747.

*To all whom it may concern:*

Be it known that I, JOHN K. GUMPPER, a citizen of the United States, residing at Decatur, in the county of Macon and State of Illinois, have invented a certain new and useful Improvement in Wheel-Removing Tools, of which the following is a full, clear, concise, and exact description, reference being had to the accompanying drawings, forming a part of this specification.

My invention relates to wheels and axles and has particular reference to an improved wheel removing tool.

The object of my invention is to provide a tool particularly adapted for drawing a wheel off of an axle; which can be easily and quickly applied and removed; by which great withdrawing force can easily be applied to the wheel; and which shall consist of but a few substantial members or parts.

My invention consists in a wheel tool or jack adapted to engage the outer end of a wheel hub and provided with a powerful pressure member for engaging the outer end of the axle.

My invention also consists in a device of the character described, provided with a pair of pivotally mounted clamping jaws for engaging with the outer end of the wheel hub, a tension member for clamping the jaws upon the hub, the member formed to pass the end of the axle, and a screw for engaging with the end of the axle.

My invention also consists of the several features of construction and in the combinations and arrangements of parts by which I am enabled to attain the above-mentioned and other objects, and all as hereinafter described and particularly pointed out in the appended claims.

My invention will be more readily understood by reference to the accompanying drawing forming part of this specification and in which.

Figure 1:
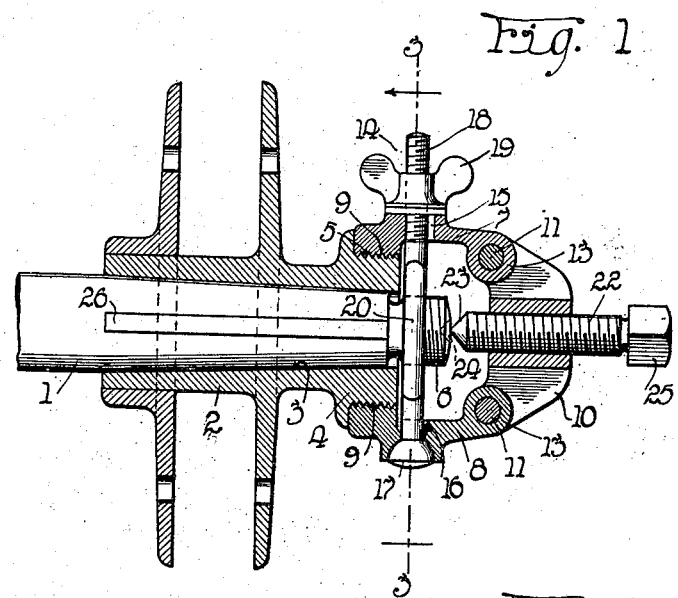
Figure 1 is a vertical central section of a wheel removing tool embodying my invention and illustrating its application to a wheel hub and axle, and taken on the line 1—1 of Fig. 2.
Figure 2:
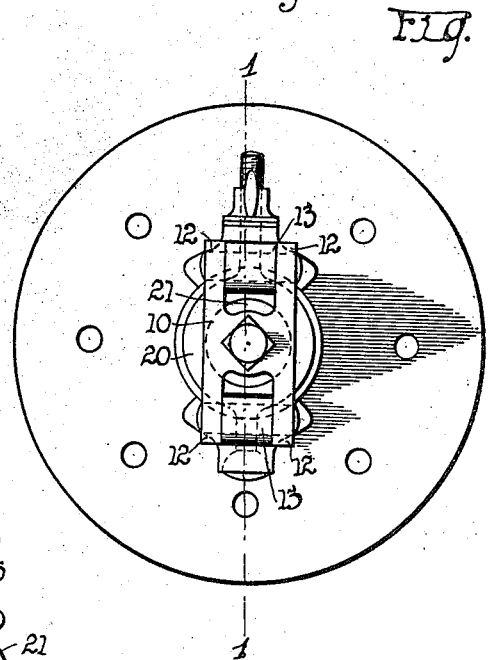
Fig. 2 is an end view of the tool and wheel hub.
Figure 3:
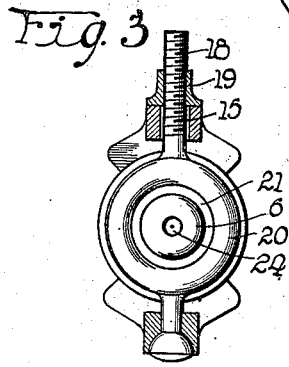
Fig. 3 is a transverse section on the line 3—3 of Fig. 1.

In said drawings 1 is the outer end portion of an axle such as a live axle of an automobile, and which is usually made on a long taper as shown, to receive the wheel hub, which is provided with a tapered central hole 3 for receiving the axle 1. The axle is often provided with one or more longitudinal keys 26 for driving engagement with the wheel hub. The hub is forced tightly upon the axle and wedges upon the long tapered end with great force so that it often becomes very difficult to start the hub off of the axle, when necessity requires, and it becomes necessary to use great pressure to remove it. Other features which add difficulties to the operation of removing the hub are that the hub and axle are fitted for engagement with other parts, usually screw threaded parts, and consequently if a hammer or like tool is used, destructive damage is likely to ensue.

For pulling the wheel off of the axle I provide means for engaging the outer end of the wheel hub, so that I can pull upon it, and I provide means for pushing upon the axle, so that the force which I apply is effectively applied to these two members.

Usually the outer end 4 of the hub 2 is provided with a screw thread 5 for the reception of a hub cap or nut, not shown, and the threaded end 6 of the axle projects beyond the end of the hub.

While I could provide other means for engagement with the thread 5 of the hub, I prefer, on account of the variation in diameter of the wheel hub ends, to provide means which are readily adjustable to fit wheel hubs of slightly varying sizes and arranged to be firmly clamped thereon.

I provide a pair of jaws 7 and 8 each having an internally threaded outer end 9 adapted for engagement with the thread 5 of the outer end 4 of the hub. I pivotally mount these jaws 7 and 8 at their rear ends on a bridge member 10 by means of pivot pins 11 so that the jaws can readily swing out and in for engagement with and disengagement from the hub. Preferably I spread these pivots apart a distance approximately equal to the diameter of the threaded end of the hub so that when the pulling strain is put upon the clamping members 7 and 8 the strain will be in direct line of these members between the bridge member 10 and the point of engagement with the hub.

I preferably form the bridge member 10 with a pair of pivot lugs 12 at each side to receive the pivot pins 11 and I form the jaws 7 and 8 with central hubs 13 at their rear ends, fitting between the lugs 12 and receiving the pivot pins 11. By this means the jaws are centrally mounted upon the bridge member and the strains of operation are balanced.

To hold the jaws 7 and 8 upon the threaded end for operation, I provide a tension clamping member 14 in the form of a bolt. This bolt passes through holes 15 and 16 in the respective jaw members 7 and 8, and is provided with a swivel head 17 on one end for engagement with the member 8 and is threaded on its opposite end 18 to receive the winged thumb nut 19. By means of this tension member I can easily and quickly firmly clamp the jaws upon the hub and I can readily spread the jaws apart sufficient to permit the direct placement of the jaws upon the hub and their removal therefrom without the necessity of screwing them on or off. To prevent interference between the tension member and the projecting end 6 of the axle I provide an open ring portion 20 at the middle of the tension member, providing a central opening 21 large enough to freely span the end of the axle.

To apply pressure to the axle I provide a set screw 22 centrally mounted in the bridge member 10 in axial alinement with the axle I and provided with a coned point 23 adapted to enter a center countersink 24 which is usually left in the outer end of every axle.

When the device has been clamped upon the wheel hub as shown, great pressure can be readily and easily applied to the axle to pull off the hub by screwing the set screw in against the end of the axle by means of a suitable wrench applied to the square head 25 of the set screw.

As many modifications of my invention will readily suggest themselves to one skilled in the art, I do not limit or confine my invention to the specific structures herein shown and described except as required by the scope of the appended claims.

I claim:

1. A device of the character described comprising a bridge member, a pair of arms pivotally mounted on the bridge member for engagement with the periphery of the outer end of a wheel hub, a tension member arranged adjacent to the outer ends of said arms, for clamping the latter upon a wheel hub, and a set screw carried by the bridge member for exerting pressure against an axle mounted in the wheel hub.

2. In a wheel removing device, a bridge member, a pair of hub clamping jaws pivotally mounted on the bridge member and provided with screw threads at their ends for engagement with the screw threaded outer end of a wheel hub, a tension member for clamping the jaws upon a hub, said tension member having an opening in its middle portion for passing an axle end within the hub, and a set screw carried by the bridge member for exerting pressure against the axle.

3. In a device of the character described, a bridge member for spanning a hub, a set screw mounted in the bridge member for engagement longitudinally with an axle, two oppositely disposed clamping arms, pivotally mounted at their rear ends upon the bridge member upon pivots spread apart a distance substantially equal to the diameter of the hub at its point of engagement, the forward ends of the arms provided with internal screw threads for engagement with an externally threaded outer end of the hub, and a tension member arranged adjacent to the outer ends of said arms for clamping them upon a hub.

4. In a device of the character described, a bridge member for spanning a hub, a set screw mounted in the bridge member for engagement longitudinally with an axle, two oppositely disposed clamping arms pivoted at their rear ends upon the bridge member, their forward ends provided with internal screw threads for engagement with an externally threaded outer end of a hub, a tension rod having engagement with said arms, adjacent to their outer ends for clamping them upon a hub, said tension rod having an opening at its middle portion for spanning an axle end projecting beyond the outer end of the hub upon which the device is clamped.

5. In a wheel pulling device, a hub member having extending arms, one of which is pivotally mounted on the hub, a bolt carried by said arms for clamping them upon a wheel hub, a head on the bolt having a swivel contact with one of the arms, and a pressure device carried by said hub for pushing an axle out of a wheel hub upon which the device is clamped.

6. In a wheel removing device, a bridge member, a pair of hub clamping jaws carried by the bridge member, one of said jaws being pivotally mounted on the bridge member, said jaws being provided with screw threads at their ends for engagement with the screw threaded outer end of a wheel hub, a tension member for clamping the jaws upon a hub, said tension member having an opening in its middle portion for passing an axle end within the hub, and a set screw carried by the bridge member for exerting pressure against an axle clamped by the jaws.

In witness whereof I hereunto subscribe my name this 10th day of June, A. D. 1918.

JOHN K. GUMPPER.

Copies of this patent may be obtained for five cents each, by addressing the "Commissioner of Patents, Washington, D. C."